Sept. 1, 1964    W. STELZER    3,147,045
BRAKE PRESSURE PROPORTIONING DEVICE
Filed Dec. 18, 1961
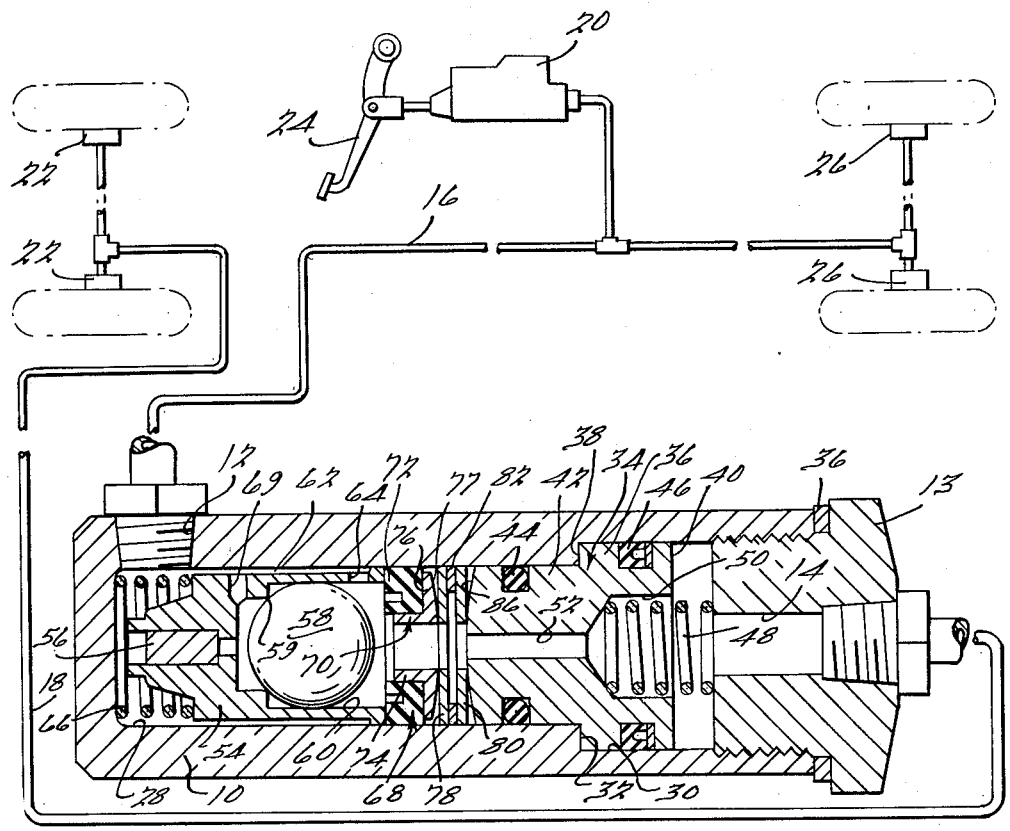
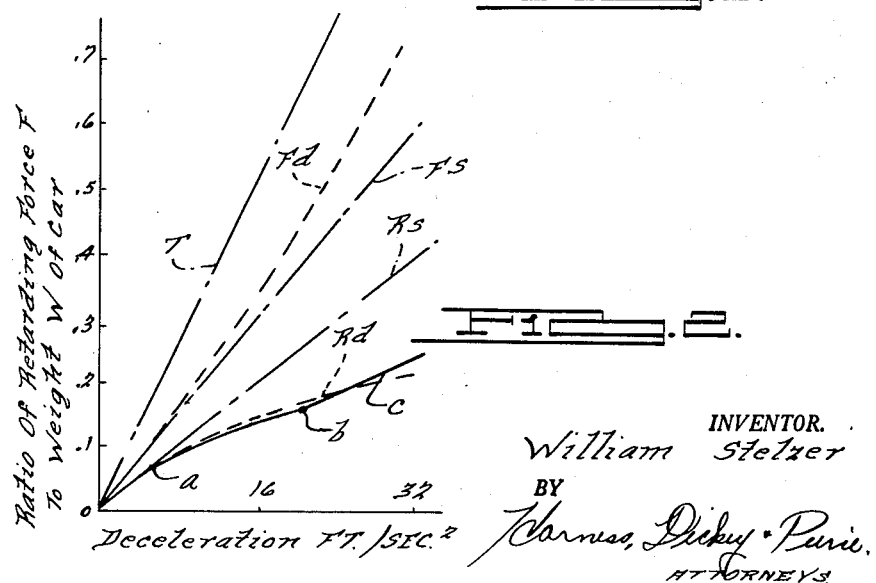
INVENTOR.
William Stelzer
BY
Karnes, Dickey & Pierce
ATTORNEYS United States Patent Office 3,147,045
Patented Sept. 1, 1964

3,147,045
BRAKE PRESSURE PROPORTIONING DEVICE
William Stelzer, Bloomfield Hills, Mich., assignor to Kelsey-Hayes Company, Romulus, Mich., a corporation of Delaware
Filed Dec. 18, 1961, Ser. No. 159,968
10 Claims. (Cl. 303—24)

This invention relates to hydraulic brake systems for vehicles and particularly to a brake pressure control device for limiting the ratio of the fluid pressure delivered to the rear wheel brake cylinders to the fluid pressure delivered to the front wheel brake cylinders during rapid braking.

The device of the present invention is intended to compensate for the transfer of vehicle weight between the rear and front wheels resulting from deceleration of the vehicle. During deceleration, a portion of the weight borne by the rear wheels of the vehicle is transferred to the front wheels and the magnitude of this weight transfer is dependent upon the rate of deceleration. Inasmuch as the total braking effort of which a given wheel is capable varies with the total weight borne by that vehicle, the effort of which the front wheels are capable is increased during deceleration, while the total braking effort of which the rear wheels are capable is simultaneously decreased. Various devices have heretofore been proposed for controlling or regulating the ratio of brake fluid pressures delivered to the front and rear wheel brake cylinders in response to the attainment of a predetermined rate of deceleration of the vehicle. However, such devices have been notably lacking in a close approximation of the ideal braking curve and have generally been expensive and generally ineffective for the intended purpose.

Accordingly, it is an object of the present invention to provide a brake pressure control device which is adapted to reproportion the relative braking pressures for the front and rear wheels of the vehicle in a manner closely approximating the ideal or maximum braking efforts of which said wheels are capable without producing premature skidding of either set of wheels.

It is another object of the present invention to provide a brake pressure control device of the above character which is completely enclosed by static fittings and seals and which eliminates the necessity for vent openings or other openings that are only separated from the brake fluid by movable seals and through which brake fluid could escape if such seals failed.

It is still another object of the present invention to provide a brake pressure control device of the above character which incorporates a novel spring arrangement adapted to provide a smooth transition between the initial and final brake pressure ratios and which eliminates any interruption in the smooth and continuous delivery of brake pressure to the brake cylinders.

It is still another object of the present invention to provide a brake pressure control device of the above character which is inexpensive of manufacture, reliable in operation and of a sturdy, long-lasting construction.

These and other objects of the present invention will become apparent from the following detailed description taken in conjunction with the accompanying drawings wherein:

FIG. 1 is a longitudinal vertical sectional view through a brake proportioning device embodying the principles of the present invention, the device being shown connected in a diagrammatically illustrated brake system; and FIG. 2 is a graph showing ideal and actual brake efforts as a function of deceleration and the braking efforts delivered as a result of the use of the device of the present invention.

Referring now to the drawings, it will be seen that the device of the present invention includes a housing 10 which has an inlet opening 12 formed in the side thereof and is provided with an end closure member 13 having an outlet opening 14. The inlet opening 12 is connected to a conduit 16 leading to the usual brake master cylinder 20, while the outlet opening 14 is connected to the rear wheel brake cylinders 22 through a conduit 18. The master cylinder 20 is operated by the usual brake pedal 24 and is also effective to directly deliver brake fluid to the front wheel brake cylinders 26.

The housing 10 is formed with a bore 28 of stepped diameter in fluid communication with the inlet opening 12 at one end thereof and with the outlet opening 14 at its other end. The bore 28 has a portion 30 at the end thereof adjacent the outlet opening 14 of increased diameter. A radial shoulder 32 interconnects the walls of the main portion of the bore 28 and the bore portion 30. A divided piston mechanism is disposed within the bore 30 and includes a first piston member 34 having a large diameter portion 36 smoothly and slidably fitted within the bore portion 30 and a radial shoulder 38 abuttable with the shoulder 32. A smaller diameter portion 42 of the first piston member 34 is smoothly but slidably fitted within the main portion of the bore 28. An O-ring 44 is recessed within the periphery of the piston portion 42 and sealingly engages the wall of the main portion of the bore 28, while a seal 46 is recessed within the periphery of the piston portion 36 and sealingly contacts the wall of the bore portion 30. A light-weight centering spring 48 abuts the end closure member 13 at one end thereof and is seated at its other end within a recess 50 formed in the first piston member 34 to maintain the shoulder 38 of the first piston member 34 against the bore shoulder 32. The recess 50 communicates with a passage 52 extending completely through the first piston member 34 to the left-hand end thereof, as seen in FIG. 1.

A cage or supporting member 54 of non-magnetic material is positioned within the left-hand end of the bore 28 and carries a permanent magnet 56 which magnetically attracts a valve element 58 in the form of a steel ball to hold the ball against an annular edge 59 thereof during initial setting or light usage of the brakes, as well as during non-application of the brakes. The ball is generally located within a central opening 60 formed in the cage, which is in fluid communication with the inlet opening 12 through peripheral axially extending grooves 62 and openings 64 formed in the cage 54. The cage 54 is biased in a right-hand direction by a light-weight spring 66 to maintain the cage in engagement with a second piston member 68 which forms a part of the divided piston mechanism. The piston member 68 is composed of a retainer element 70 and a combined valve seat and seal 72 made of rubber, neoprene or other elastomeric material adhered to the retainer element 70. The combined valve seat and seal 72 is of annular configuration and the inner diameter thereof is engaged by a sleeve portion 74 of the retainer member 70. The retainer member 70 also includes a radially outwardly extending flange portion 76 having an annular surface 77 on the side thereof opposite the first piston member 34, which is curved radially outwardly away from the piston member 34.

The first piston member 34 and the second piston member 68 are held in spaced relationship by a first spring 78 in the form of a washer, a second spring 80 also in the form of an apertured washer and an annular washer 82. The washer spring 78 engages the retainer member surface 77 adjacent the inner diameter thereof, while the washer spring 80 engages a surface 86 formed on the left-hand end of the piston member 34, which curves radially outwardly and away from the second piston member 68 in a manner similar to the contour of the surface 77. The washer 82 engages both of the washer springs 78 and 80 adjacent the outer diameter thereof and only occupies the space between the washers 78 and 80 at the radially outer margin thereof, thus leaving an open space between the washers 78 and 80 at their inner diameters.

When the brakes are not being applied or during light brake application, fluid pressure is transmitted from the inlet opening 12 to the interior of the bore 28, through the slots 62, the openings 64 and through the hollow interior of the second piston member 68 and the springs 78 and 80 to the passage 52. Fluid pressure is then transmitted through the recess 50 directly to the outlet opening 14. The operation of the brake system under such circumstances is the same as it would be in the absence of the entire device of the present invention. However, when the vehicle is decelerated by a predetermined amount, established by the strength of the magnet 56, the momentum of the ball 58 will overcome the attraction of the magnet 56 and move in a direction away from the magnet 56 against the valve seat member 72, closing the opening therethrough and thus interrupting the previously described path of direct fluid transmission from the inlet to the outlet opening. It will be noted that, in its new location, the ball 58 is less subject to the attraction of the magnet 56, inasmuch as it is further away from its field. The ball 58 is further held against the valve seat 72 by inlet fluid pressure. Prior to the closure of the ball 58, fluid under pressure was disposed in the space between the first piston member 34 and the second piston member 68, as well as on the other sides of said piston members. Accordingly, the forces tending to move the second piston member 68 in either direction were neutralized. By virtue of the greater area of the first piston member 34 exposed to fluid on the right-hand side thereof, prior to the closure of the ball 58 the first piston member 34 was held with its shoulder 38 against the bore shoulder 32. After closure of the ball, however, further pressurization of the fluid at the outlet opening 14 can only be accomplished by pressurization of fluid on the right-hand side of the ball 58. In view of the greater area of the first piston member 34 which is effective to pressurize fluid at the outlet opening upon right-hand movement thereof as compared to the area of the second piston member 68 acted upon by inlet fluid pressure to move said second piston member in a right-hand direction, it will be apparent that a definite increase in inlet fluid pressure over the pressure prevailing at the moment of closure of the ball 58 will be required to move the first piston member 34 from the position in which it is shown in the drawing. This, of course, results from the fact that the pressure acting on one end of the piston mechanism will pressurize fluid at the other end in inverse proportion to the effective piston areas involved. Accordingly, no movement of the first piston member 34 will take place until a substantial increase in inlet fluid pressure has been produced. However, the second piston member 68 is still free to move after closure of the ball 58, in view of the fact that the spring washers 78 and 80 will yield and distort to a substantially conical form, conforming to the surfaces 77 and 86. It will, of course, be appreciated that the spring members 78 and 80 increasingly resist movement of the second piston member 68 relative to the first piston member 34. However, the movement of the second piston member 68 permitted by the spring washers 78 and 80 after closure of the ball 58 permits sufficient pressurization of fluid at the outlet 14 to provide a relatively smooth transition between the first braking stage, in which the ball is open, and the last stage, in which the first piston member 34 moves to the right to transmit a braking force in a fixed ratio established by the relative diameters of the main portion of the bore 28 and the increased diameter bore portion 30. Thus, the springs 78 and 80 eliminate a period in the braking cycle in which no increase in rear wheel braking pressure would occur.

It will be further noted that the construction of the device of the present invention eliminates the necessity for any vent openings and all parts of the device are positively sealed with respect to the fluid system. Failure of any of the seals between the movable piston elements and the surrounding bore wall will not result in external leakage of braking fluid.

It will also be apparent that the device of the present invention eliminates the necessity for utilizing brake fluid for any purpose other than the transmission of fluid pressure to the outlet opening 14. It will also be apparent that the novel spring structure illustrated herein requires very little movement of parts in order to accomplish the intended result. Accordingly, a very slight movement of the second piston 68 is necessary before both pistons will move together.

FIG. 2 is a graphic representation of the distribution of braking force for a given vehicle during deceleration. Line T represents the total braking effort or retarding force of both front and rear wheels. The retarding force is expressed in terms of a ratio compared to the total weight of the vehicle. Lines $F_s$ and $R_s$ represent the relative retarding effort of the front and rear brakes in the absence of the device of the present invention. The difference in these amounts may be assumed to be established by the use of different size brake cylinders, it being standard practice to utilize larger front wheel brake cylinders in front engine passenger cars. Lines $F_d$ and $R_d$ represent the ideal retarding forces for the front and rear wheels during deceleration. The formation of these lines is governed by the transfer of weight from the rear wheels to the front wheels. It will be noted that the ratio of the retarding force of the front brakes relative to the retarding force of the rear brakes is increased as deceleration is increased. Line C indicates the results obtained by the use of the control device of the present invention. Point $a$ on line $R_s$ indicates the point at which the ball 58 closes. Point $b$ represents the point at which the springs 78 and 80 have been fully distorted and the pistons 34 and 68 move together. After point $b$, the ratio is fixed and line C is perfectly straight. That portion of line C between points $a$ and $b$ represents the action of springs 78 and 80 which provides a smooth transition between the initial stage of braking and the final stage represented by that portion of line C beyond point $b$. Line C very closely approximates the ideal distribution of braking force to the rear wheels with no interruption in the smooth application of brakes to the rear wheels.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. A brake pressure control device for a vehicle including a housing having an inlet opening, an outlet opening and a bore providing communication between said inlet opening and said outlet opening, a pressure proportioning piston in said bore, means providing a passage for the direct transmission of fluid pressure from said inlet to said outlet past said piston, a movable element movable relative to said piston and toward said outlet opening, said movable element having a valve seat arranged to block the flow of fluid through said passage upon the closure of said valve seat, means for closing said valve seat upon the occurrence of predetermined conditions during brake application, and means yieldingly resisting movement of said movable element toward said outlet opening.

2. A brake pressure control device for a vehicle including a housing having an inlet opening, an outlet opening and a bore providing communication between said inlet opening and said outlet opening, a pressure proportioning piston in said bore, means providing a passage for the direct transmission of fluid pressure from said inlet to said outlet past said piston, a movable element associated with said passage at one end thereof and being movable relative to said piston and toward said outlet opening, said movable element having an annular valve seat through which fluid flows to reach said passage from said inlet, means adapted to sealingly contact said valve seat and prevent the flow of fluid therethrough upon the occurrence of predetermined conditions during brake application, and a spring yieldingly resisting movement of said movable element in a direction pressurizing fluid at said outlet opening.

3. A brake pressure control device for a vehicle including a housing having an inlet opening, an outlet opening and a bore providing communication between said inlet opening and said outlet opening, a pressure proportioning piston in said bore, said piston having a passage therethrough for the direct transmission of fluid pressure from said inlet opening to said outlet opening, a movable element having a valve seat arranged to block the flow of fluid through said passage upon the closure of said valve seat, said movable element being axially movable in said bore relative to said piston and toward said outlet opening, means adapted to close said valve seat upon the occurrence of predetermined conditions during brake application, and means yieldingly resisting movement of said movable element toward said outlet opening.

4. A brake pressure control device for a vehicle including a housing having an inlet opening adapted to be connected to a source of fluid pressure, an outlet opening adapted to be connected to a brake cylinder and a bore providing fluid communication between said inlet and outlet openings, a first piston in said bore, a second piston in said bore, spring means intermediate said pistons holding said pistons in spaced relationship, means providing an opening for the direct transmission of fluid pressure from said inlet opening to said outlet opening and to the space between said first and second pistons, and a valve element for closing said last named opening, said spring means being yieldable after closure of said valve element to permit relative movement of said pistons toward one another.

5. A brake pressure control device for a vehicle including a housing having an inlet opening, an outlet opening and a bore providing fluid communication between said inlet opening and said outlet opening, said bore having a first portion of one diameter and a second portion of a larger diameter, a first piston having a portion sealingly and slidably disposed in said first bore portion, a second piston sealingly and slidably disposed in said second bore portion, spring means disposed between said piston members and holding said piston members in spaced relationship, means providing an opening for the direct transmission of fluid pressure from said inlet opening to said outlet opening and to the space between said piston members and a deceleration responsive valve element for closing said last-named opening, said spring means being yieldable to permit movement of said second piston under the influence of inlet fluid pressure after closure of said valve element and prior to movement of said first piston.

6. A brake pressure control device for a vehicle including a housing having an inlet opening, an outlet opening and a bore providing fluid communication between said inlet opening and said outlet opening, said bore having a first portion of a given diameter and a second portion of a different diameter, a first piston having a portion sealingly and slidably disposed in said first bore portion, a second piston sealingly and slidably disposed in said second bore portion, spring means disposed between said piston members and holding said piston members in spaced relationship, said pistons and springs having openings therethrough for the direct transmission of fluid pressure from said inlet opening to said outlet opening and to the space between said piston members, a valve element for closing the opening in the one of said pistons adjacent said inlet opening, said spring means being yieldable to permit movement of one of said pistons under the influence of inlet fluid pressure after closure of said valve element and prior to movement of the other of said pistons.

7. A brake pressure control device for a vehicle including a housing having an inlet opening, an outlet opening and a bore providing fluid communication between said inlet opening and said outlet opening, said bore having a first portion of a one diameter, a second portion of a larger diameter, and a radial shoulder between said bore portions, a first piston having a portion sealingly and slidably disposed in said first bore portion and a second piston sealingly and slidably disposed in said second bore portion and having a shoulder engageable with said bore shoulder, spring means disposed between said piston members and holding said piston members in spaced relationship, means providing an opening for fluid communication from said inlet opening to said outlet opening and to the space between said piston members, a valve element for closing said last-named opening, said spring means being yieldable to permit movement of said second piston member under the influence of inlet fluid pressure after closure of said valve element and prior to movement of said first piston member.

8. A brake pressure control device for a vehicle including a housing having an inlet opening, an outlet opening and a bore providing fluid communication between said inlet opening and said outlet opening, said bore having a first portion of a given diameter and a second portion of a larger diameter, a first piston having a portion sealingly and slidably disposed in said first bore portion and a second piston sealingly and slidably disposed in said second bore portion, both of said pistons having openings therethrough for the direct transmission of fluid pressure from said inlet opening to said outlet openings valve element for blocking the direct transmission of fluid pressure through said piston openings, one of said pistons having an annular end wall facing the other of said pistons which extends radially outwardly and away from the other of said pistons, a spring member of flat annular shape engaging said end wall adjacent the inner diameter thereof, and means in force transmitting relation with the other of said pistons engaging said spring member adjacent the outer diameter thereof, said spring member being yieldable by distortion of its outer periphery to permit relative movement of said pistons toward one another.

9. A brake pressure control device for a vehicle including a housing having an inlet opening, an outlet opening and a bore providing fluid communication between said inlet opening and said outlet opening, said bore having a first portion of a given diameter and a second portion of a larger diameter, a first piston having a portion sealingly and slidably disposed in said first diameter bore portion and a second piston sealingly and slidably disposed in said second bore portion, both of said pistons having openings therethrough for the direct transmission of fluid pressure from said inlet opening to said outlet opening, a valve element for blocking the direct transmission of fluid pressure completely through both of said openings, both of said pistons having annular end walls at the ends thereof adjacent one another, said end walls extending radially outwardly and away from the other of said pistons, a pair of spring members of flat annular shape each engaging one of said end walls adjacent the inner diameter thereof, and an annular member disposed between said spring members and engaging said spring members at the radially outer margin thereof, said spring members being yieldable by distortion of the radially outer portions thereof to permit relative movement of said pistons toward one another.

10. A brake pressure control device for a vehicle including a housing having an inlet opening, an outlet opening and a bore providing fluid communication between said inlet opening and said outlet opening, said bore having a first portion of small diameter, a second portion of large diameter and a radial shoulder intermediate said first and second portions, a first piston slidably disposed in said first bore portion, a second piston having a portion slidably disposed in said second bore portion and a shoulder engageable with said bore shoulder, both of said pistons having openings therethrough for the direct transmisison of fluid pressure from said inlet opening to said outlet opening, a valve element for closing the opening of said first piston, and spring means disposed between said pistons and normally holding said pistons in spaced relationship, said spring means being yieldable after closure of said valve element to permit movement of said first piston toward said second piston while said second piston is disposed in a position with its shoulder in engagement with the shoulder of said bore.

References Cited in the file of this patent
UNITED STATES PATENTS 2,218,194     Freeman _____ Oct. 15, 1940

UNITED STATES PATENT OFFICE
CERTIFICATE OF CORRECTION

Patent No. 3,147,045 September 1, 1964

William Stelzer

It is hereby certified that error appears in the above numbered patent requiring correction and that the said Letters Patent should read as corrected below.

Column 6, line 40, for "openings valve" read -- opening, a valve --.

Signed and sealed this 12th day of January 1965.

(SEAL)
Attest:

ERNEST W. SWIDER
Attesting Officer

EDWARD J. BRENNER
Commissioner of Patents